United States Patent [19]

Maris et al.

[11] Patent Number: 6,013,717

[45] Date of Patent: Jan. 11, 2000

[54] FREE FLOWING POWDER COMPOSITION, PROCESS FOR ITS PREPARATION AND HOMOGENEOUS LAYER DERIVED THEREFROM

[75] Inventors: Catherine Augusta Louis Maris; Olivier Roumache, both of Louvaine-la-Neuve, Belgium

[73] Assignee: Shell Oil Company, Houston, Tex.

[21] Appl. No.: 08/666,766

[22] Filed: Jun. 19, 1996

[30] Foreign Application Priority Data

Jun. 19, 1995 [EP] European Pat. Off. ............... 95304225

[51] Int. Cl.⁷ ....................................... C08L 53/00
[52] U.S. Cl. ........................... 524/505; 524/515; 524/525
[58] Field of Search ..................... 524/505, 515, 524/525

[56] References Cited

U.S. PATENT DOCUMENTS

| | | |
|---|---|---|
| 4,163,031 | 7/1979 | Hannon et al. . |
| 4,213,869 | 7/1980 | Kosinsky . |
| 4,325,770 | 4/1982 | Korpman ................................ 156/230 |
| 5,060,818 | 10/1991 | Doe et al. . |

FOREIGN PATENT DOCUMENTS

| | | | |
|---|---|---|---|
| 0659831 | 6/1995 | European Pat. Off. . | |
| 3705992 | 8/1987 | Germany . | |
| 03182586 | 8/1991 | Japan ............................. | B65D 53/08 |
| 04031254 | 2/1992 | Japan ............................. | B65D 53/04 |
| 04091144 | 3/1992 | Japan ............................. | B65D 53/06 |

*Primary Examiner*—Edward J. Cain
*Attorney, Agent, or Firm*—Donald F. Haas

[57] ABSTRACT

Free flowing powder composition with a particle size of 800 $\mu$m or less, comprising (a) 100 parts by weight of a block copolymer, comprising at least one poly (predominantly monovinyl aromatic hydrocarbon) block and at least one substantially hydrogenated poly(predominantly conjugated diene) block and having a monovinyl aromatic hydrocarbon content in the range of from 10 to 60% by weight, preferably 10 to 35% by weight, based on total weight of block copolymer;

(b) 100 to 200 and preferably from 100 to 150, parts by weight of a plasticiser;

(c) 50 to 100, preferably 70 to 90, parts by weight of a resin, which is compatible with the substantially hydrogenated poly(conjugated diene) block; and optionally (d) a dusting agent in amount of from 0 to 10% by weight and preferably 0.5 to 3% by weight, based on total weight of composition;

process for its preparation and flexible elastic sterilisable homogeneous layers derived from it.

12 Claims, No Drawings

FREE FLOWING POWDER COMPOSITION, PROCESS FOR ITS PREPARATION AND HOMOGENEOUS LAYER DERIVED THEREFROM

FIELD OF THE INVENTION

The present invention relates to a free flowing powder composition, to a process for the preparation thereof and a homogeneous layer derived therefrom.

In particular the invention relates to a free flowing powder composition, comprising at least one block copolymer derived from a monovinyl aromatic and a conjugated diene and forming a sterilisable, flexible and elastic homogeneous layer. Such layer is in particular to be used for wide bottle or jar cap sealant.

BACKGROUND OF THE INVENTION

Up to now rubber latexes are widely used in for instance the carpet industry as backing for carpets as well as in the paper and board industry for coating purposes. However, the use of such rubber latexes, i.e. a dispersion of a thermoplastic rubber in an organic solvent, are undesired from an environmental point of view due to the evaporation of organic solvent and due to the fact that recycling of latexes is not possible. Hence, there is a need for suitable, environmentally friendly alternatives for rubber latexes.

U.S. Pat. No. 4,163,031 discloses a powder composition useful for coating applications comprising a blend of 25 to 90% by weight of a selectively hydrogenated block copolymer and 75 to 10% by weight of one or more aromatic melt flow modifiers which are at least partially hydrogenated to remove the aromatic character thereof. The block copolymer comprises monovinyl arene endblocks and at least partially hydrogenated conjugated diene midblock(s) and has a monovinyl arene content of from 5 to 50% by weight. The powder composition may further contain up to 8% by weight of a silicon containing adhesion promoter. U.S. Pat. No. 4,163,031 further discloses a process for preparing such powder composition comprising the subsequent steps of melt blending the components, followed by cooling, pelletizing the composition and pulverizing, e.g. by cryogenic grounding, the pellets to the desired pellet size.

U.S. Pat. No. 4,325,770 discloses a process for preparing pressure sensitive adhesive coated products, wherein a thermoplastic elastomer and a tackifying resin are separately pulverized, after which the powders thus obtained are dry-blended at ambient temperature. The powder blend thus obtained is dry coated onto the surface of a substrate and the powder coated substrate subsequently is heated, thus allowing the powder particles to melt together to form a homogeneous coating. Finally, the coating is cooled to ambient temperature.

The thermoplastic elastomer employed is an ABA type block copolymer with A being a poly(alkenyl arene) blocks and B a poly(conjugated diene) block. Pulverizing of this block copolymer takes place at temperatures below −20° C., preferably below −50° C.

Both U.S. patents discussed above disclose methods of preparing powders containing elastomeric block copolymers. However, none of the powders disclosed contain any plasticizer oil, as a result of which the coatings prepared from these powders are rather rigid, which makes them unsuitable for applications requiring flexible and elastic coatings or layers, such as e.g. in carpet backings, conveyor belts, bottle cap seals, underbody car coatings and rubberized textiles, fabrics, paper or board. Up to know it was generally believed that plasticizer oils could not be part of a free flowing powder composition containing an elastomeric block copolymer, since the oil would cause the individual powder particles to adhere to one another, thus making it very difficult to handle the powder. Moreover, storage of a powder already containing oil was believed to be in fact impossible. Therefore, the normal procedure was to prepare a free flowing powder of block copolymer, possibly together with some other non-tacky components, and to add the oil only at the moment the powder was to be processed, thus avoiding agglomeration problems arising during storage. Also for reasons of expected coagulation problems, simultaneously pulverizing elastomeric polymers on the one hand and plasticizing oils and/or tackifying resins on the other hand, was avoided. This is illustrated by U.S. Pat. No. 4,325,770, where block copolymer and tackifying resin are separately pulverized before being dry-blended.

On the other hand, a resin composition for cap liners of vessels was known from e.g. Japanese patent applications J04091144A, J04031254A, J03182586 and U.S. Pat. No. 5,060,818. Japanese patent application J04091144 disclosed a bottle cap liner composition, comprising (a) 5 to 90 wt % of a hydrogenated styrene]-butadiene] block copolymer, having a melt flow rate of 20 g/10 min or less (b) 2–50 wt % of polypropylene type resin having a melt flow rate of 0.1 to 50 g/10 min 230° C., 2.16 kgf)

(c) 5–70 wt % of fluidising paraffin having viscosity of 50–350 cps (37.8° C.), and (d) 0.01–50 wt % of polypropylene type resin grafted with unsaturated carboxylic acid or its derivative Said composition was mentioned to show high adhesiveness to caps, flexibility, heat stability and high sealing ability.

The Japanese patent application J04031254 disclosed a disk polymer composition liner, which was pressed to the inner face of the top of metal shell. The polymer composition was a mixture of a polypropylene-based resin, a hydrogenated block copolymerised elastomer, a softening material and a lubricant.

The softening agent comprised a paraffin-based naphtalene based or aromatic-based softening agent.

The metal cap was mentioned to be used in a plastic bottle, whose filling contents requires heat sterilisation and contain a gas component, such as carbonated drinks. The use of said mixture might provide the cap with moderate rigidity.

Japanese patent application J03182586 disclosed a liner composition for plastic caps, comprising (A) 100 parts by weight of a resin mixture, consisting of 50–5 wt % of a polypropylene type resin (homo-block- or random-copolymer) (a,1) and 50–95 wt % of hydrogenated block copolymer of styrene and butadiene (a,2), and 0.1–5 parts by weight of lubricant (a,3) or (B) 100 parts by weight of a resin mixture consisting of 70–5 wt % of polypropylene type resin (a,1) (homo-, block- or random-copolymer) and 30–95 wt % of hydrogenated block copolymer of styrene and hutadiene (a,2);

0.1–5 parts by weight of a lubricant and less than 10 parts by weight of a softening agent.

The lubricant could be selected from the groups of amides, aliphatic esters of monoalcohols or polyols and aliphatic alcohols or acids and was preferably a higher fatty acid amide or a fatty ester of monohydroxy or polyhydroxy alcohol.

Softening agents were indicated to be paraffinic, naphtenic or aromatic hydrocarbons.

U.S. Pat. No. 5,060,818 disclosed a heat resistant lined container cover, consisting of a container cover body and a liner on the internal surface of the cover body top plating. The liner was formed by a composition, containing (i) 10–60 wt % of a hydrogenated styrene/butadiene block copolymer, (ii) 10–80 wt % of a liquid paraffin, having a viscosity of 50–400 centistokes (37.8° C.)

(iii) 5–60 wt % of isotactic propylene resin having a melt index of 2–20 g/10 min.

In particular in column 2, lines 40 f.f. of said patent there was clearly taught, that those hydrogenated styrene/butadiene block copolymers had to be used, which had a melt index smaller than 0.1 g/10 min and preferably smaller than 0.01 g/10 min, whereas ordinary hydrogenated styrene-butadiene block copolymer had a melt index of 0.1 to 10 g/10 min, and had an extreme high molecular weight. The composition was applied under softening or melting condition to the internal surface of the cover body top plating, having the top plating area and the skirt area. The composition was pressed under cooling in to mould liner shape.

However not any reference was made in these four publications to the preparation of a stable free flowing powder, which could be easily processed into a homogeneous elastic flexible sterilisable sealant layer and more in particular could be processed by applying a layer of particles into the desired shape and transform them into a continuous homogeneous layer by a short period heat irradiation.

Accordingly, it would be very advantageous from a processing and a cost perspective, if a stable and storable, free flowing powder composition would be available, which should contain an elastomeric polymer as well as a plasticising oil, and which should be easily be processed into a homogeneous flexible and elastic layer.

The present invention aims to provide such stable free flowing powder composition containing both elastomeric polymer and plasticising oil, which composition can be stored without problems. Furthermore, it is an object of the present invention to provide a free flowing powder composition, which can be suitable applied for preparing homogeneous flexible and elastic layers. Still a further object of the present invention is to provide a process for the preparation of a stable, free flowing powder composition, which process can easily be carried out and is economically attractive. Finally, it is an object of the present invention to provide a homogeneous layer obtainable from the free flowing powder composition, which layer can suitably be applied as a wide bottle or jar cap sealant.

SUMMARY OF THE INVENTION

Accordingly, the present invention relates to a free flowing powder composition with a particle size of 800 μm or less comprising:

(a) 100 parts by weight of a block copolymer, comprising at least one poly (predominantly monovinyl aromatic hydrocarbon) block and at least one substantially hydrogenated poly(predominantly conjugated diene) block and having a monovinyl aromatic hydrocarbon content in the range of from 10 to 60% by weight, preferably 10 to 35% by weight, based on total weight of block copolymer;

(b) 100 to 200 and preferably from 100 to 150, parts by weight of a plasticiser;

(c) 45 to 100, preferably 50 to 85, parts by weight of a resin, which is compatible with the substantially hydrogenated poly(conjugated diene) block; and optionally (d) a dusting agent in amount of from 0 to 10% by weight and preferably 0.5 to 3% by weight, based on total weight of composition.

DETAILED DESCRIPTION OF THE INVENTION

With the expression "free flowing powder composition" us used throughout this specification is meant a powder of which the particles consist of a composition containing at least the components (a) to (d) as defined above and of which the particles do not adhere to one another.

The size of the powder particles is expressed in terms of the particle's diameter. In general, this size is determined by sieving and is independent of the shape of the particle. The particle size should always be 800 μm or less and in particular in the range of from 100 to 700 μm. It is primarily determined by the desired end-use. For instance, if the powder is to be used for making a thin, smooth coating, the particle size should be relatively small, i.e. in the range of from 100 to 500 μm, while in this case a small particle size distribution is highly preferred. On the other hand, if the powder is to be used for preparing a thicker layer or coating whereby the smoothness of the surface is not particularly critical, such as for instance a carpet backing, the powder particles do not need to be very small, while the particle size distribution is not particularly critical. In this case the particle size may suitably lie within the range of from 200 to 700 μm.

In particular, the particle size to be applied for wide bottle cap or jar cap sealing preferably lies between 100 and 600 μm and even more preferably between 100 and 500 μm.

The block copolymer used in principle may be any block copolymer comprising at least one poly(monovinyl aromatic hydrocarbon) block and at least one substantially hydrogenated poly(conjugated diene) block.

The block copolymer may have a linear, radial or star-shaped structure. Preferred block copolymers are linear block copolymer comprising two poly(predominantly monovinyl aromatic hydrocarbon) endblocks and one substantially hydrogenated poly(predominantly conjugated diene) midblock (A—B—A). With the terms "predominantly monovinyl aromatic" and "predominantly conjugated diene" as used throughout the specification, is meant that apart from the main monomer, polymer blocks A and B may contain small amounts, i.e. up to 20% by weight but preferably less than 10% by weight, of one or more other monomers which are copolymerisable with the said main monomer. Other suitable types of block copolymers are those containing homopolymeric blocks as well as tapered polymer blocks, i.e. polymer blocks containing both monovinyl aromatic hydrocarbon and conjugated diene wherein the content of one of these monomers gradually increases in one direction. Also mixtures of different block copolymers may be used, for instance an AB/ABA block copolymer mixture with A and B as defined above. For all types of block copolymers it is preferred that the poly (predominantly monovinyl aromatic hydrocarbon) block is a poly(predominantly styrene) block and the poly (predominantly conjugated diene) block is a poly-(predominantly)butadiene or poly(predominantly isoprene) block and more preferably poly(butadiene). More preferably block copolymers are used, wherein the blocks A and B have been derived from substantially pure single monomer.

The apparent molecular weight of the block copolymer, i.e. the molecular weight as determined by gel permeation chromatography using polystyrene calibration standards, may vary over a broad range and suitably lies within the range of from 25,000 to 1,000,000, preferably 50,000 to 500,000. In the event of branched or star-shaped block copolymers the apparent molecular weight may even exceed 1,000,000.

In general, the block copolymers may be produced by any well known manufacturing process, such as e.g. disclosed in U.S. Pat. Nos. 3,322,856; 3,231,635; 4,077,893; 4,219,627; 4,391,949; 4,185,042; 4,539,136; 5,268,429; U.S. Pat. Nos. 5,173,537; 5,281,666; 5,336,737; European patents nos. 0186918; 0358382; 0301665; 0316982; 0368419; 0401897; 0467429; 0471415; 0460725 and PCT application WO 94 22931.

With the term substantially hydrogenated as used throughout the present specification is meant that a residual ethylenical unsaturation after hydrogenation is less than 15%, preferably less than 5% and more preferably 2% or less.

Examples of suitable commercially available selectively hydrogenated block copolymers are KRATON G 1650, 1651, 1652 and 1657 (all linear styrene-ethylene/butylene-styrene block copolymers having styrene cortent of respectively of 30%, 33%, 30% and 13%).

Mineral oils, both naphthenic and paraffinic oils, or low molecular weight polybutylene polymers may be used as plasticisers. Examples of suitable plasticisers are SHELL-FLEX 371 and 451, CATENEX 956 and TUFFLO 6204 (naphthenic oils), TUFFLO 6056, EZL 675 and PRIMOL 352 (paraffinic oils) and the polybutylenes HYVIS 200, NAPVIS 30, NAPVIS D-10. SHELLFLEX, CATENEX, TUFFLO, HYVIS, NAPVIS PRIMOL, EZL, are trade marks. Also very useful are poly-α-olefin based products, such as e.g. ETHYLFLO (ETHYLFLO is a trade mark), as well as other commercially available plasticisers, ONDINA 68 (ONDINA is a trade mark) and V-OIL 7047 (V-OIL is a trade mark). The plasticiser is preferably used in amounts of from 100 to 150 phr, most preferably 100 to 125 phr. The abbreviation "phr" stands for parts by weight per 100 parts by weight of rubber, i.e. block copolymer.

The plasticiser is essential for obtaining a powder which, after fusion of the powder particles upon exposure to heat, results in a homogeneous layer having a smooth surface.

It is preferred that the viscosity of the plasticiser and more preferably liquid paraffins, used in the compositions of the present invention is in the range from 50 to 400 cSt (40° C.) and more in particular from 50 to 200 cSt.

Resins, which are compatible with the hydrogenated poly (conjugated diene) block and more in particular with the hydrogenated poly(butadiene) block, wherein a significant fraction of the 1,3 butadiene monomer has been polymerised according to 1,2 addition, i.e. which are compatible with ethylene-butylene blocks (E-B), can be selected from homopolymer, random-copolymer or block-copolymer from one or more lower α-olefins, such as poly(ethylene), poly (propylene) and copolymers of propylene and/or ethylene with other olefins.

Preferably substantially pure poly (propylene) or copolymers of predominantly propylene (at least 95 wt % of propylene and minor Preferably substantially pure poly (propylene) or copolymers of predominantly propylene (at least 95 wt % of propylene and minor amounts of ethylene or butylene as comonomer), are used and more preferably poly(propylene), having a melt flow rate of 60–100 g/10 min (230° C., 2.16 kgf) and more in particular from 60 to 80 g/10 min is used, such as NOVOLENE 1000 UCX polypropylene.

It will be appreciated that the poly(propylene) or copolymers to be used in the free flowing powders of the present invention, were found to be necessary on the one hand in order to obtain a sterilisable sealant composition, whereas on the other hand were found to have a high melt flow rate in order to be fusable in a sufficient degree for forming an elastic flexible homogeneous layer.

The dusting agent is very fine powder, i.e. a powder of which the average particle size lies in the range of from 1 nm and 100 μm, preferably between 5 nm and 10 μm. In principle any such fine powder may be employed, but it is preferred that silica or calcium carbonate powder is used. Examples of commercially available silica powders are AEROSIL R972 (average particle size about 16 nm), AEROSIL 200 (average particle size about 12 nm), SIPERNAT, DUROSIL, DUREX and ULTRASIL. DURCAL 5 (average particle size 6 μm) and MILLICARB (average particle size 3 μm) are examples of commercially available calcium carbonate powders. AEROSIL, SIPERNAT, DUROSIL, DUREX, ULTRASIL, DURCAL and MILLICARB are trade marks. The dusting agent may be used in an amount of from 0 to 10% by weight, preferably from 0.5 to 3% by weight, based on total weight of composition.

The free flowing powder composition of the present invention may also contain a blowing agent. The presence of a blowing agent in the final free flowing powder composition, may be desired if the powder composition is to be applied as a foamed bottle cap liner. Normally, a blowing agent decomposes above a certain temperature thereby releasing gas, such as e.g. nitrogen, which causes a volume increase of the reaction mass. The temperature at which the blowing agent starts decomposing is further referred to as the activation temperature. Generally known blowing agents are for instance azodicarbonamide-based compounds and diphenyloxide-4,4'-disulphohydrazide. The latter is commercially available under the trade name GENITRON OB (GENITRON is a trade mark), while the azodicarbonamide-based compounds are commercially available as GENITRON EPE, EPA and EPB. If present at all, the blowing agent may be present in the free flowing powder composition in amounts up to 3% by weight, preferably from 0.2 to 3% by weight, more preferably from 0.5 to 2.5% by weight based on the total weight of composition.

In addition to the components described above, other conventional ingredients such as dyes, antioxidants, UV stabilisers, slipping agents, and the like may be present as well if desired. Such ingredients are only present in small quantities, i.e. up to 2% by weight based on the total weight of the composition. In this respect is noted that several inorganic filler materials listed above also may have flame retarding properties and hence may be present in larger quantities than 2% by weight.

For example, in order to adjust the opening torgue to an easy open level, a fatty acid, a fatty acid derivative such as an amide or a wax or other lubricant also can be incorporated. On the other hand, in order to color or opacify the liner, a white pigment such as titanium dioxide or a coloring pigment, such as carbon black, red iron oxide can be incorporated.

As antioxidant a sterically hindered phenol can be used.

The present invention further relates to a process for the preparation of the free flowing powder composition as hereinbefore described, said process comprising the steps of:

(a) melt blending all components present in the free flowing powder composition except the dusting agent and the blowing agent, if present, followed by cooling;

(b) granulating or pelletizing the composition resulting from step (a);

(c) cryogenically milling the granules or pellets resulting from step (b); and (d) dry-blending the dusting agent and optionally the blowing agent with the powder resulting from step (c).

Up to now it was considered impossible to cryogenically mill a composition containing selectively hydrogenated monovinyl aromatic-conjugated diene block copolymers as well as components which soften the block copolymer, such as plasticising oils and resins interfering with the poly (ethylene butylene) blocks. It is generally believed that due to the presence of oil, the powder particles would be unstable and would tend to adhere to one another, thus, making it very difficult to obtain a stable, free flowing powder which could be stored for longer periods of time. Surprisingly, it has now been found that it is possible to obtain a stable, free flowing powder of a composition containing both block copolymer and oil. In order to obtain such stable powder it is essential that after the cryogenic milling a dusting agent is added. Without being bound to any particular theory, it is believed that the very fine, dusting agent particles are attached to the surface of the powder particles resulting from the cryogenic milling, thus preventing these powder particles from adhering to one another.

Cryogenic milling of the granules or pellets resulting from step (b) may be performed through the conventional cryogenic milling techniques, wherein for instance liquid nitrogen often is used as the chilling medium. For less smaller particles, the said granules or pellets may also be cryogenically milled using liquid carbon dioxide or freon as the chilling medium.

The free flowing powder of the present invention can be used to form a homogeneous layer having a smooth surface and more in particular a bottle cap or jar lid sealing. In order to obtain such flexible, elastic layer, the dry free flowing powder should first be brought onto a suitable underground as a layer. Upon exposure to heat, the powder particles then fuse and a homogeneous layer is formed. If a foamed layer is desired, a blowing agent is necessary. As already indicated supra, a blowing agent decomposes above its activation temperature. Since the components constituting the powder composition are first melt-blended, i.e. blended at an elevated temperature above the melting temperatures of the components, the blowing agent is only added in powder form after the cryogenic milling and is simply dry-blended with the powder resulting from the cryogenic milling. Otherwise, it would already decompose during the melt-blending step. Thus, if a blowing agent is present in the final powder and this powder is heated to a sufficiently high temperature, fusing of the powder particles and foaming will simultaneously occur and a foamed layer will be formed. In this case the density of the layer will be lower than in the event no blowing agent is used. If a blowing agent is present in the powder composition, a homogeneous layer having a density as low as 0.5 g/cm$^3$ can be obtained. This is extremely low for compositions containing elastomeric block copolymers and oil. Accordingly, the present invention also embraces homogeneous layers obtainable by fusing the free flowing powder composition described above. Preferably, the fusing of the free flowing powder composition is realised by heating a layer of the composition. A preferred method of heating is subjecting the unfused powder composition to infra-red radiation. However, other heating methods, such as flame-spraying or contacting hot objects with the powder thus establishing fusion of the powder particles at the surface of the said object, may be applied as well. Fluidised bed and rotational moulding techniques are very useful in the latter heating method.

It will be understood that in particular wide bottle cap or jar lid sealing consisting of a homogeneous layer derived from the free flowing powder composition, as well as other shaped articles containing a layer of the fused free flowing powder composition, such as carpet backing layers conveyor belts, also form part of the present invention.

The invention is further illustrated by the following example, however without restricting its scope to this specific embodiment.

EXAMPLE 1

A composition consisting of:

100 parts by weight (pbw) KRATON G-1652 (styrene content 30%)

105 pbw of oil (PRIMOL 352)

55 pbw polypropylene NOVOLEN 1100 UCX 1 pbw of antioxidant (IRGANOX 1010)

was prepared by dry-blending the components and subsequently extruding the blend thus obtained in a BETOL corotating twin screw extruder, characterised by temperature settings between 150 and 190° C., screw speed 120 rpm, die pressure 7.5–9 bar, output 5 kg/h. The composition was allowed to cool and was subsequently granulated. KRATON, IRGANOX, PRIMOL and NOVOLEN are trademarks. The granulated composition was then cryogenically milled into a fine powder having the following particle size distribution: 100% by weight had a particle size below 600 μm, 98% by weight had a particle size below 450 μm, 73% by weight had a particle size below 355 μm, 17% by weight had a particle size below 250 μm and 3% by weight had a particle size below 100 μm. (determined according to the sieving method ASTM D 1921)

18 pbw (about 0.7% by weight) of dusting agent was subsequently added and admixed with the powder.

The resulting free flowing powder was stable and showed no fusion of powder particles, even after having been stored for 8 weeks.

The free flowing agent was formed into a sheet and was heated in an oven at 180° C. for 10 minutes to form coherent sheets with smooth surfaces.

Dumbbells were made by injection moulding (Battenfeld Injection Moulder; temperature setting 170–180° C., mould temperature 30° C.) in order to measure the following mechanical properties.

| Properties | |
|---|---|
| Hardness, | Shore A |
| 0 sec | 69 |
| 30 sec | 64 |
| Modulus 100%, | MPa 3.0 |
| Modulus 300%, | MPa 4.0 |
| Tensile strength, | MPa 5.2 |
| Elongation at break, | % 468 |
| Drop point, | ° C. 211 |
| $MFR$(190° C./2.16 kg)' | g/10 min 138 |

After 'sterilisation test' the sealant remained complete with only a slight variation in thickness of the slab.

The following methods were applied:

| Property | Standard method |
| --- | --- |
| Hardness (stack of 3 * 2 mm samples) | ASTM D2240 |
| Tensile properties | ISO 527 |
| Melt flow rate | ISO 1133 |

Resistance to sterilisation: Glass bottles or containers are filled with food at 70–80° C. Steam (>120° C.) is flushed against the jar and the cap. The jar is closed and when food cools down, the water vapour precipitates and vacuum is obtained in the space between food and zap. No standard test is related to this property. A fine slab was placed in a cap, put in an oven at 120° C. for 15 minutes, the jar was then closed and allowed to cool down.

A similar test was done at 120° C. after powder had been fused at 180° C. in a cap and allowed to cool down.

We claim:

1. A free flowing powder composition, comprising particles with a particle size of 800 82 m or less, each particle consisting essentially of:
   100 parts by weight of a block copolymer, the block copolymer comprising at least one poly(predominantly monovinyl aromatic hydrocarbon) block and at least one substantially hydrogenated or unhydrogenated poly(predominantiy conjugated diene) block and having a monovinyl aromatic hydrocarbon content in the range of from 10 to 60% by weight based on total weight of block copolymers;
   from 100 to 200 parts by weight of a plasticiser;
   from 45 to 100 parts by weight of a resin, which is compatible with the substantially hydrogenated poly(conjugated diene) which is selected from the group consisting of substantially pure polypropyline or copolymers of predominantly propylene having a melt flow rate of 60 to 100 grams per 10 minutes (230° C., 2.16 kgf); and
   optionally a dusting agent in an amount from 0 to 10% by weight based on total weight of the particle.

2. Free flowing powder composition according to claim 1, characterised in that the particle size is in the range between 100 and 600 µm.

3. Free flowing powder composition according to claim 1, characterised in that selectively hydrogenated linear block copolymer ABA are used, wherein A is a poly(substantially pure styrene) block and B is a hydrogenated poly(substantially pure butadiene) block or a poly(substantially pure isoprene) block.

4. Free flowing powder composition according to claim 1, characterised in that the plasticisers is used in amounts in the range from 100 to 125 phr.

5. Free flowing powder composition according to claim 1, characterised in that the viscosity of the plasticiser is in the range of from 50 to 400 cSt (at 40° C.).

6. Free flowing powder composition according to claim 1, characterised in that the viscosity of the plasticiser is in the range of from 50 to 200 cSt.

7. Free flowing powder composition according to claim 1, characterized in that the resin, which is compatible with the substantially hydrogenated poly(conjugated diene), is substantially pure poly(propylene) or copolymers containing at least 95 wt % of propylene.

8. Free flowing powder composition according to claim 7, characterised in that the poly(propylene) or copolymers have a melt flow rate of 60–100 g/10 min (230° C.; 2.16 kgf).

9. Free flowing powder composition according to claim 1, characterised in that a dusting agent is used in an amount of 0.5 to 3 wt %.

10. Free flowing powder composition according to claim 1, characterised in that a dusting agent is used, of which the average particle size lies in the range of from 1 µm to 100 µm.

11. Free flowing powder composition according to claim 1, characterised in that silica or calcium carbonate is used as dusting agent.

12. Process for the preparation of a free flowing powder composition, the free flowing composition comprising particles with a particle size of 800 µm or less, each particle comprising 100 parts by weight of a block copolymer, the block copolymers consisting essentially of at least one poly(predominantly monovinyl aromatic hydrocarbon) block and at least one substantially hydrogenated or unhydrogenated poly(predominantly conjugated diene) block and having a monovinyl aromatic hydrocarbon content in the range of from 10 to 60% by weight based on total weight of block copolymer, from 100 to 200 parts by weight of a plasticiser, and from 45 to 100 parts by weight of a resin which is compatible with the substantially hydrogenated poly(conjugated diene) which is selected from the group consisting of substantially pure polypropylene or copolymers of predominantly propylene having a melt flow rate of 60 to 100 grams per 10 minutes (230° C., 2.16 kgf), the process comprising the steps of:
   melt blending all components present in the free flowing powder composition except any dusting agent or any blowing agent, if present, followed by cooling;
   granulating or pelletizing the composition after melt blending;
   cryogenically milling the granules or pellets; and
   dry-blending a dusting agent and optionally a blowing agent with the granules or pellets.

* * * * *